(12) United States Patent
Lambert

(10) Patent No.: US 9,860,862 B1
(45) Date of Patent: Jan. 2, 2018

(54) METHODS AND APPARATUS FOR SELECTING A DEVICE TO PERFORM SHARED FUNCTIONALITY IN A DETERMINISTIC AND FAIR MANNER IN A WIRELESS DATA COMMUNICATION SYSTEM

(71) Applicant: Marvell International Ltd., Hamilton (BM)

(72) Inventor: Paul A. Lambert, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/362,657

(22) Filed: Nov. 28, 2016

Related U.S. Application Data

(63) Continuation of application No. 14/281,693, filed on May 19, 2014, now Pat. No. 9,521,635.

(Continued)

(51) Int. Cl.
*H04W 56/00* (2009.01)
*H04W 40/24* (2009.01)
(Continued)

(52) U.S. Cl.
CPC ....... *H04W 56/001* (2013.01); *H04W 40/244* (2013.01); *H04W 76/021* (2013.01);
(Continued)

(58) Field of Classification Search
CPC ............. H04W 56/0015; H04W 48/16; H04W 56/001; H04W 56/002; H04W 56/0025
See application file for complete search history.

(56) References Cited

U.S. PATENT DOCUMENTS

| 5,155,833 A | 10/1992 | Cullison et al. |
| 5,390,165 A | 2/1995 | Tuch |

(Continued)

FOREIGN PATENT DOCUMENTS

| CN | 88102647 | 12/1988 |
| CN | 1140272 | 1/1997 |

(Continued)

OTHER PUBLICATIONS

"Advisory Action", U.S. Appl. No. 13/804,425, Dec. 26, 2014, 3 pages.

(Continued)

*Primary Examiner* — Raj Jain

(57) ABSTRACT

The present disclosure describes methods and apparatus for selecting a device to perform shared functionality in a deterministic and fair manner in a wireless data communication system. A wireless data communication system includes multiple wireless transceiver devices and certain functionality, such as the transmitting of a beacon used to synchronize the wireless transceiver devices, is distributed among the wireless transceiver devices. Each wireless transceiver device generates a device rank for a given time for itself as well as one or more other wireless transceiver devices in a deterministic and fair manner. Each wireless transceiver device determines the same device ranks for the wireless transceiver devices, and each wireless transceiver device selects the wireless transceiver device having a highest device rank at any given time as the wireless transceiver device that is to perform the functionality at that given time.

20 Claims, 5 Drawing Sheets

Related U.S. Application Data

(60) Provisional application No. 61/825,686, filed on May 21, 2013.

(51) Int. Cl.
*H04W 76/02* (2009.01)
*H04W 48/16* (2009.01)

(52) U.S. Cl.
CPC .......... *H04W 48/16* (2013.01); *H04W 56/002* (2013.01); *H04W 56/0015* (2013.01); *H04W 56/0025* (2013.01)

(56) References Cited

U.S. PATENT DOCUMENTS

| | | | |
|---|---|---|---|
| 5,467,398 | A | 11/1995 | Pierce et al. |
| 5,469,506 | A | 11/1995 | Berson et al. |
| 5,479,514 | A | 12/1995 | Klonowski |
| 5,481,733 | A | 1/1996 | Douglis et al. |
| 5,617,118 | A | 4/1997 | Thompson |
| 5,673,416 | A | 9/1997 | Chee et al. |
| 5,696,989 | A | 12/1997 | Miura et al. |
| 5,771,356 | A | 6/1998 | Leger et al. |
| 5,828,835 | A | 10/1998 | Isfeld et al. |
| 5,884,099 | A | 3/1999 | Klingelhofer |
| 5,991,519 | A | 11/1999 | Benhammou et al. |
| 6,006,018 | A | 12/1999 | Burnett et al. |
| 6,014,722 | A | 1/2000 | Rudin et al. |
| 6,058,188 | A | 5/2000 | Chandersekaran et al. |
| 6,092,108 | A | 7/2000 | DiPlacido et al. |
| 6,145,069 | A | 11/2000 | Dye |
| 6,167,514 | A | 12/2000 | Matsui et al. |
| 6,216,230 | B1 | 4/2001 | Rallis et al. |
| 6,230,277 | B1 | 5/2001 | Nakaoka et al. |
| 6,330,626 | B1 | 12/2001 | Dennin et al. |
| 6,389,538 | B1 | 5/2002 | Gruse et al. |
| 6,463,509 | B1 | 10/2002 | Teoman et al. |
| 6,473,861 | B1 | 10/2002 | Stokes |
| 6,564,318 | B1 | 5/2003 | Gharda et al. |
| 6,601,167 | B1 | 7/2003 | Gibson et al. |
| 6,614,985 | B1 | 9/2003 | Tokunaka et al. |
| 6,678,790 | B1 | 1/2004 | Kumar |
| 6,704,872 | B1 | 3/2004 | Okada |
| 6,711,447 | B1 | 3/2004 | Saeed |
| 6,756,988 | B1 | 6/2004 | Wang et al. |
| 6,799,271 | B2 | 9/2004 | Kugai |
| 6,823,472 | B1 | 11/2004 | DeKoning et al. |
| 6,832,280 | B2 | 12/2004 | Malik et al. |
| 6,901,298 | B1 | 5/2005 | Govindaraj et al. |
| 7,010,808 | B1 | 3/2006 | Leung et al. |
| 7,035,827 | B2 | 4/2006 | Ezaki |
| 7,036,018 | B2 | 4/2006 | Horvat et al. |
| 7,069,439 | B1 | 6/2006 | Chen et al. |
| 7,089,419 | B2 | 8/2006 | Foster et al. |
| 7,103,788 | B1 | 9/2006 | Souza et al. |
| 7,117,352 | B1 | 10/2006 | Giles et al. |
| 7,126,913 | B1 | 10/2006 | Patel et al. |
| 7,194,638 | B1 | 3/2007 | Larky |
| 7,206,940 | B2 | 4/2007 | Evans et al. |
| 7,210,038 | B2 | 4/2007 | Walmsley |
| 7,266,842 | B2 | 9/2007 | Foster et al. |
| 7,299,365 | B2 | 11/2007 | Evans |
| 7,308,591 | B2 | 12/2007 | Dubinsky |
| 7,333,464 | B2 | 2/2008 | Yang et al. |
| 7,356,707 | B2 | 4/2008 | Foster et al. |
| 7,370,349 | B2 | 5/2008 | Holvey et al. |
| 7,373,506 | B2 | 5/2008 | Asano et al. |
| 7,376,976 | B2 | 5/2008 | Fierstein et al. |
| 7,496,952 | B2 | 2/2009 | Edwards et al. |
| 7,499,548 | B2 | 3/2009 | Meandzija et al. |
| 7,511,636 | B2 | 3/2009 | Takahashi |
| 7,516,325 | B2 | 4/2009 | Willey |
| 7,522,726 | B2 | 4/2009 | Ishiguro et al. |
| 7,536,558 | B2 | 5/2009 | Neble et al. |
| 7,549,056 | B2 | 6/2009 | Carr |
| 7,571,216 | B1 | 8/2009 | McRae et al. |
| 7,596,614 | B2 | 9/2009 | Saunderson et al. |
| 7,606,230 | B1 | 10/2009 | Cohen et al. |
| 7,620,784 | B2 | 11/2009 | Panabaker |
| 7,676,040 | B2 | 3/2010 | Augenstein et al. |
| 7,725,738 | B1 | 5/2010 | Langhammer et al. |
| 7,743,260 | B2 | 6/2010 | Fetik |
| 7,774,635 | B2 | 8/2010 | Shiota |
| 7,788,670 | B2 | 8/2010 | Bodas et al. |
| 7,813,326 | B1 | 10/2010 | Kelm et al. |
| 7,818,389 | B1 | 10/2010 | Chiang et al. |
| 7,835,725 | B2 | 11/2010 | Suzuki et al. |
| 7,865,733 | B2 | 1/2011 | Goto et al. |
| 7,873,841 | B2 | 1/2011 | Mullis, II et al. |
| 7,898,857 | B2 | 3/2011 | Kirsch et al. |
| 7,900,060 | B2 | 3/2011 | Hodzic |
| 7,916,594 | B2 | 3/2011 | Yang |
| 7,991,943 | B2 | 8/2011 | Berenbaum et al. |
| 7,995,596 | B2 | 8/2011 | Kuila et al. |
| 8,000,284 | B2 | 8/2011 | Lott et al. |
| 8,001,592 | B2 | 8/2011 | Hatakeyama |
| 8,094,822 | B2 | 1/2012 | Suzuki |
| 8,095,816 | B1 | 1/2012 | Chan |
| 8,117,478 | B2 | 2/2012 | Liu et al. |
| 8,139,521 | B2 | 3/2012 | Mukherjee et al. |
| 8,166,309 | B2 | 4/2012 | Muralidharan et al. |
| 8,171,309 | B1 | 5/2012 | Poo |
| 8,296,555 | B2 | 10/2012 | Chu |
| 8,321,706 | B2 | 11/2012 | Zhang |
| 8,327,056 | B1 | 12/2012 | Chan |
| 8,418,242 | B2 | 4/2013 | Zhang |
| 8,423,789 | B1 | 4/2013 | Poo |
| 8,437,290 | B2 * | 5/2013 | Kalhan ............... H04W 76/025 370/328 |
| 8,443,187 | B1 | 5/2013 | Orr |
| 8,443,211 | B2 | 5/2013 | Zhao et al. |
| 8,483,718 | B2 | 7/2013 | Hwang |
| 8,510,560 | B1 | 8/2013 | Lambert et al. |
| 8,576,961 | B1 * | 11/2013 | Zhu ..................... H04L 27/2656 327/141 |
| 8,645,716 | B1 | 2/2014 | Dujari et al. |
| 8,688,968 | B2 | 4/2014 | Chu et al. |
| 8,694,782 | B2 | 4/2014 | Lambert |
| 8,839,016 | B2 | 9/2014 | Zhang et al. |
| 8,843,686 | B1 | 9/2014 | Chan et al. |
| 9,009,778 | B2 | 4/2015 | Pearce et al. |
| 9,141,394 | B2 | 9/2015 | Sakarda |
| 9,204,244 | B2 * | 12/2015 | Rantala ................. H04W 4/008 |
| 9,220,012 | B1 | 12/2015 | Inamdar |
| 9,253,175 | B1 | 2/2016 | Orr |
| 9,363,249 | B2 | 6/2016 | Lambert et al. |
| 9,398,455 | B2 | 7/2016 | Lambert |
| 9,402,270 | B2 | 7/2016 | Lambert |
| 9,521,635 | B1 | 12/2016 | Lambert |
| 9,736,801 | B1 | 8/2017 | Lambert |
| 2002/0065834 | A1 | 5/2002 | Wiggen et al. |
| 2002/0069354 | A1 | 6/2002 | Fallon et al. |
| 2002/0082035 | A1 | 6/2002 | Aihara et al. |
| 2002/0087816 | A1 | 7/2002 | Atkinson et al. |
| 2002/0103930 | A1 | 8/2002 | Kamentsky et al. |
| 2003/0014368 | A1 | 1/2003 | Leurig et al. |
| 2003/0188162 | A1 | 10/2003 | Candelore et al. |
| 2003/0200453 | A1 | 10/2003 | Foster et al. |
| 2003/0200454 | A1 | 10/2003 | Foster et al. |
| 2003/0208675 | A1 | 11/2003 | Burokas et al. |
| 2003/0236991 | A1 | 12/2003 | Letsinger |
| 2004/0015621 | A1 | 1/2004 | Tanaka |
| 2004/0030909 | A1 | 2/2004 | Sako et al. |
| 2004/0054898 | A1 | 3/2004 | Chao et al. |
| 2004/0103272 | A1 | 5/2004 | Zimmer et al. |
| 2004/0125679 | A1 | 7/2004 | Kwean |
| 2004/0158669 | A1 | 8/2004 | Weng et al. |
| 2004/0158708 | A1 | 8/2004 | Peyravian et al. |
| 2004/0184343 | A1 | 9/2004 | Roohparvar et al. |
| 2004/0187001 | A1 | 9/2004 | Bousis |
| 2004/0193875 | A1 | 9/2004 | Aura |
| 2004/0257462 | A1 | 12/2004 | Goris et al. |
| 2004/0264699 | A1 | 12/2004 | Meandzija et al. |
| 2004/0266386 | A1 | 12/2004 | Kuo |

(56) References Cited

U.S. PATENT DOCUMENTS

| | | |
|---|---|---|
| 2005/0015602 A1 | 1/2005 | Rees |
| 2005/0033869 A1 | 2/2005 | Cline |
| 2005/0055547 A1 | 3/2005 | Kawamura |
| 2005/0086551 A1 | 4/2005 | Wirasinghe et al. |
| 2005/0088980 A1* | 4/2005 | Olkkonen ............ H04W 48/16 370/255 |
| 2005/0089005 A1 | 4/2005 | Sakoda et al. |
| 2005/0108171 A1 | 5/2005 | Bajikar et al. |
| 2005/0114686 A1 | 5/2005 | Ball et al. |
| 2005/0138365 A1 | 6/2005 | Bellipady et al. |
| 2005/0144468 A1 | 6/2005 | Northcutt et al. |
| 2005/0156925 A1 | 7/2005 | Fong et al. |
| 2005/0177674 A1 | 8/2005 | Ober et al. |
| 2005/0185596 A1 | 8/2005 | Kamentsky et al. |
| 2005/0210290 A1 | 9/2005 | Ono et al. |
| 2005/0278523 A1 | 12/2005 | Fortin et al. |
| 2006/0004946 A1 | 1/2006 | Shah et al. |
| 2006/0019653 A1 | 1/2006 | Stamoulis et al. |
| 2006/0036897 A1 | 2/2006 | Lin et al. |
| 2006/0059372 A1 | 3/2006 | Fayar et al. |
| 2006/0072748 A1 | 4/2006 | Buer |
| 2006/0075259 A1 | 4/2006 | Bajikar et al. |
| 2006/0090084 A1 | 4/2006 | Buer |
| 2006/0104243 A1 | 5/2006 | Park |
| 2006/0117177 A1 | 6/2006 | Buer |
| 2006/0123248 A1 | 6/2006 | Porter et al. |
| 2006/0136735 A1 | 6/2006 | Plotkin et al. |
| 2006/0142906 A1 | 6/2006 | Brozovich et al. |
| 2006/0156390 A1 | 7/2006 | Baugher |
| 2006/0200670 A1 | 9/2006 | Kuffel et al. |
| 2006/0209595 A1 | 9/2006 | Newell |
| 2006/0233149 A1 | 10/2006 | Rustagi et al. |
| 2006/0253704 A1 | 11/2006 | Kempf et al. |
| 2006/0253716 A1 | 11/2006 | Dhiman et al. |
| 2006/0259656 A1 | 11/2006 | Sullivan |
| 2006/0285686 A1 | 12/2006 | Van Den Heuvel et al. |
| 2007/0005824 A1 | 1/2007 | Howard |
| 2007/0011445 A1 | 1/2007 | Waltermann et al. |
| 2007/0022469 A1 | 1/2007 | Cooper et al. |
| 2007/0038866 A1 | 2/2007 | Bardsley et al. |
| 2007/0073915 A1 | 3/2007 | Go et al. |
| 2007/0097904 A1 | 5/2007 | Mukherjee et al. |
| 2007/0098178 A1 | 5/2007 | Raikar |
| 2007/0136792 A1 | 6/2007 | Ting et al. |
| 2007/0150756 A1 | 6/2007 | Kudelski |
| 2007/0174602 A1 | 7/2007 | Kao |
| 2007/0180271 A1 | 8/2007 | Hatakeyama et al. |
| 2007/0186105 A1 | 8/2007 | Bailey et al. |
| 2007/0189249 A1 | 8/2007 | Gurevich et al. |
| 2007/0220501 A1 | 9/2007 | Yanagawa et al. |
| 2007/0234028 A1 | 10/2007 | Rothman et al. |
| 2007/0242643 A1 | 10/2007 | Chandra et al. |
| 2007/0260905 A1 | 11/2007 | Marsden et al. |
| 2007/0277051 A1 | 11/2007 | Reece et al. |
| 2007/0297606 A1 | 12/2007 | Tkacik et al. |
| 2008/0005549 A1 | 1/2008 | Ke |
| 2008/0016313 A1 | 1/2008 | Murotake et al. |
| 2008/0028243 A1 | 1/2008 | Morisawa |
| 2008/0034411 A1 | 2/2008 | Aoyama |
| 2008/0043508 A1 | 2/2008 | Chao et al. |
| 2008/0046732 A1 | 2/2008 | Fu et al. |
| 2008/0066075 A1 | 3/2008 | Nutter et al. |
| 2008/0072311 A1 | 3/2008 | Mullick et al. |
| 2008/0082837 A1 | 4/2008 | Mattsson |
| 2008/0091944 A1 | 4/2008 | von Mueller et al. |
| 2008/0104422 A1 | 5/2008 | Mullis et al. |
| 2008/0108322 A1 | 5/2008 | Upp |
| 2008/0120717 A1 | 5/2008 | Shakkarwar |
| 2008/0165952 A1 | 7/2008 | Smith et al. |
| 2008/0181154 A1 | 7/2008 | Sherman |
| 2008/0295157 A1 | 11/2008 | Wong et al. |
| 2008/0298289 A1 | 12/2008 | Jeyaseelan |
| 2008/0313462 A1 | 12/2008 | Zhao et al. |
| 2009/0006658 A1 | 1/2009 | Gough et al. |
| 2009/0019250 A1 | 1/2009 | Rofougaran et al. |
| 2009/0024846 A1 | 1/2009 | Ganesan et al. |
| 2009/0049222 A1 | 2/2009 | Lee et al. |
| 2009/0059841 A1 | 3/2009 | Laroia et al. |
| 2009/0077618 A1 | 3/2009 | Pearce et al. |
| 2009/0080389 A1 | 3/2009 | Messerges et al. |
| 2009/0131061 A1 | 5/2009 | Palanki et al. |
| 2009/0199031 A1 | 8/2009 | Zhang et al. |
| 2009/0217043 A1 | 8/2009 | Metke et al. |
| 2009/0254771 A1 | 10/2009 | So et al. |
| 2009/0296866 A1 | 12/2009 | Hsieh |
| 2009/0323972 A1 | 12/2009 | Kohno et al. |
| 2009/0327608 A1 | 12/2009 | Eschmann et al. |
| 2010/0023747 A1 | 1/2010 | Asnaashari et al. |
| 2010/0039864 A1 | 2/2010 | Sarin et al. |
| 2010/0058045 A1 | 3/2010 | Borras et al. |
| 2010/0070751 A1 | 3/2010 | Chue |
| 2010/0174934 A1 | 7/2010 | Zhao |
| 2010/0217935 A1 | 8/2010 | Cho et al. |
| 2011/0039592 A1 | 2/2011 | Haddad et al. |
| 2011/0211564 A1 | 9/2011 | Yoneyama et al. |
| 2011/0231649 A1 | 9/2011 | Bollay et al. |
| 2011/0231652 A1 | 9/2011 | Bollay et al. |
| 2012/0284517 A1 | 11/2012 | Lambert |
| 2012/0287337 A1 | 11/2012 | Kumar et al. |
| 2013/0031346 A1 | 1/2013 | Sakarda |
| 2013/0046966 A1 | 2/2013 | Chu |
| 2013/0124844 A1 | 5/2013 | Baratam |
| 2013/0132502 A1* | 5/2013 | Stacey ............. H04W 56/0015 709/208 |
| 2013/0143499 A1 | 6/2013 | Ando et al. |
| 2013/0148639 A1 | 6/2013 | Gao et al. |
| 2013/0246792 A1 | 9/2013 | Lambert |
| 2013/0329620 A1 | 12/2013 | Kim et al. |
| 2013/0346777 A1 | 12/2013 | Zhang |
| 2014/0036787 A1 | 2/2014 | Ganu et al. |
| 2014/0045536 A1 | 2/2014 | Sydir et al. |
| 2014/0092877 A1* | 4/2014 | Kazmi ................. H04W 88/06 370/336 |
| 2014/0171109 A1 | 6/2014 | Segev |
| 2014/0200044 A1 | 7/2014 | Kimura et al. |
| 2014/0258724 A1 | 9/2014 | Lambert et al. |
| 2015/0006633 A1 | 1/2015 | Vandwalle et al. |
| 2015/0036540 A1 | 2/2015 | Kasslin et al. |
| 2015/0071438 A1 | 3/2015 | Lambert |
| 2015/0131529 A1 | 5/2015 | Zhou et al. |
| 2015/0131571 A1 | 5/2015 | Fodor et al. |
| 2015/0200811 A1 | 7/2015 | Kasslin et al. |
| 2015/0230043 A1 | 8/2015 | Yakir et al. |
| 2016/0209200 A1 | 7/2016 | Kanayama |

FOREIGN PATENT DOCUMENTS

| | | |
|---|---|---|
| CN | 101097522 | 1/2008 |
| CN | 102272734 | 9/2014 |
| EP | 1847911 | 10/2007 |
| EP | 2493230 | 8/2012 |
| EP | 2605170 | 6/2013 |
| GB | 2407239 | 4/2005 |
| JP | 08076872 | 3/1996 |
| JP | 09044418 | 2/1997 |
| JP | 10320302 | 12/1998 |
| JP | 2002099502 | 4/2002 |
| JP | 2002215409 | 8/2002 |
| JP | 2004005254 | 1/2004 |
| JP | 2005011120 | 1/2005 |
| JP | 5565778 | 6/2014 |
| WO | WO-2013019423 | 2/2013 |
| WO | WO-2013074797 | 5/2013 |

OTHER PUBLICATIONS

"Amendment 3: Enhancements for Very High Throughput in the 50 GHz Band", Sponsor IEEE 802.11 Committee of the IEEE Computer Society, IEEE P802.11ad/D5.0 (Draft Amendment Based on IEEE P802.11REVmb D10.0) (Amendment to IEEE 802.11REVmb D10.0 as amended by IEEE 802.11ae D5.0 and IEEE 802.11aa 06.0); Draft Standard for Information Technology Telecommunications and Information Exchange, Sep. 2011, 601 pages.

(56) References Cited

OTHER PUBLICATIONS

"Amendment 3: Enhancements for Very High Throughput in the 60 GHz Band", IEEE Standard for Information technology; Telecommunications and information exchange between systems; Local and metropolitan area networks; Specific requirements; Part 11: Wireless LAN Medium Access Control (MAC) and Physical Layer (PHY) Specifications, Jul. 2012, 628 pages.

"Amendment 4: Enhancements for Very High Throughput for Operation in Bands below 6 GHz", IEEE Standard for Information technology; Telecommunications and information exchange between systems; Local and metropolitan area networks; Specific requirements; Part 11: Wireless LAN Medium Access Control (MAC) and Physical Layer (PHY) Specifications, Sep. 2011, 425 pages.

"Amendment 4: TV White Spaces Operation", The Institute of Electrical and Electronics Engineers, Inc., IEEE Std P802.11af/D1. 05 Draft Standard for Information Technology—Telecommunications and Information Exchange Between Systems—Local and Metropolitan area networks—Specific Requirements, Part 11: Wireless LAN Medium Access Control (MAC) and Physical Layer, Nov. 2011, 123 Pages.

"Amendment 6: Sub 1 GHz License Exempt Operation", 802.11 Working Group of the LAN/MAN Standards Committee of the IEEE Computer Society, IEEE P802.11ah/D1.0 Draft Standard for Information Technology—Telecommunications and Information exchange between systems Local and Metropolitan Area Networks—Specific Requirements Part 11: Wireless LAN Medium Access Control (MAC) and Physical Layer (PH, Oct. 2013, 394 Pages.

"Amendment 8: IEEE 802.11 Wireless Network Management", Prepared by the LAN/MAN Standards Committee of the IEEE Computer Society, Draft Standard for Information technology Telecommunications and information exchange between systems-Local and metropolitan area networks Specific requirements—Part 11: Wireless LAN Medium Access Control (MAC) and Physical Layer (PHY) specifications, Aug. 2010, 426 Pages.

"Board Opinion", CN Application No. 200980136849.9, Aug. 28, 2015, 18 Pages.

"Corrected Notice of Allowance", U.S. Appl. No. 13/676,701, May 18, 2016, 2 pages.

"Examiner's Answer to Appeal Brief", U.S. Appl. No. 13/958,101, Apr. 8, 2016, 9 pages.

"Extensions to Direct Link Setup (DLS) Comments", IEEE, P802.11z, Jul. 2009, pp. 1-3.

"Final Office Action", U.S. Appl. No. 12/098,254, May 18, 2011, 11 pages.

"Final Office Action", U.S. Appl. No. 12/101,668, May 10, 2012, 8 pages.

"Final Office Action", U.S. Appl. No. 12/125,670, May 24, 2011, 11 pages.

"Final Office Action", U.S. Appl. No. 12/125,693, Jun. 9, 2011, 9 pages.

"Final Office Action", U.S. Appl. No. 12/178,268, May 25, 2011, 13 pages.

"Final Office Action", U.S. Appl. No. 12/541,731, May 31, 2012, 11 pages.

"Final Office Action", U.S. Appl. No. 13/552,421, Mar. 16, 2015, 10 pages.

"Final Office Action", U.S. Appl. No. 13/804,425, Nov. 6, 2015, 9 pages.

"Final Office Action", U.S. Appl. No. 13/804,425, Nov. 21, 2014, 17 pages.

"Final Office Action", U.S. Appl. No. 13/863,079, Jan. 15, 2015, 7 pages.

"Final Office Action", U.S. Appl. No. 13/863,079, May 7, 2014, 7 pages.

"Final Office Action", U.S. Appl. No. 13/958,101, Dec. 19, 2014, 17 pages.

"Final Office Action", U.S. Appl. No. 14/281,671, Apr. 25, 2016, 14 pages.

"Foreign Office Action", CN Application No. 200980136849.9, May 24, 2013, 20 Pages.

"Foreign Decision to Grant", JP Application No. 2011-544456, May 20, 2014, 2 pages.

"Foreign Notice of Allowance", CN Application No. 200980153758.6, Jul. 15, 2014, 4 Pages.

"Foreign Notice of Allowance", JP Application No. 2011-527899, Jan. 28, 2014, 1 Page.

"Foreign Office Action", CN Application No. 200980136849.9, Feb. 7, 2014, 15 Pages.

"Foreign Office Action", CN Application No. 200980136849.9, May 19, 2014, 11 Pages.

"Foreign Office Action", CN Application No. 200980153758.6, Apr. 27, 2013, 14 pages.

"Foreign Office Action", CN Application No. 200980153758.6, Dec. 30, 2013, 8 pages.

"Foreign Office Action", CN Application No. 201280033662.8, May 3, 2016, 26 pages.

"Foreign Office Action", European Patent Application No. 09803951.4, May 24, 2012, 3 pages.

"Foreign Office Action", European Patent Application No. 09803951.4, Dec. 13, 2012, 6 pages.

"Foreign Office Action", JP Application No. 2011-527899, Apr. 16, 2013, 5 pages.

"Foreign Office Action", JP Application No. 2011-527899, Nov. 6, 2012, 4 pages.

"Foreign Office Action", JP Application No. 2011-527899, Aug. 13, 2013, 2 pages.

"Foreign Office Action", JP Application No. 2011-544456, Jan. 29, 2013, 7 pages.

"Foreign Office Action", JP Application No. 2011-544456, Dec. 3, 2013, 2 pages.

"Foreign Office Action", JP Application No. 2011-544456, Jul. 9, 2013, 6 pages.

"Foreign Office Action", KR Application No. 10-2011-7008700, Jun. 16, 2015, 13 Pages.

"IEEE Standard for Information Technology—Telecommunications and Information Exchange between Systems—Local and Metropolitan Area Networks—Specific Requirements", IEEE Std. 802.11-2007, Jun. 12, 2007, 1232 pages.

"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.

"Information Technology—Telecommunications and Information Exchange Between Systems—Local and Metropolitan Area Networks—Specfic Requirements", IEEE, Wireless LAN Medium Access Control (MAC) and Physical Layer (PHY) Specifications, Aug. 20, 1999, 531 pages.

"Intent to Grant", EP Application No. 09803951.4, May 14, 2013, 13 Pages.

"International Search Report and Written Opinion", Application No. PCT/US2009/067767, Mar. 26, 2010, 12 pages.

"International Search Report and Written Opinion", Application No. PCT/US2009/056973, Nov. 4, 2009, 13 pages.

"International Search Report and Written Opinion", Application No. PCT/US2012/047426, Oct. 19, 2012, 7 pages.

"International Search Report and Written Opinion", Application No. PCT/US2012/065290, May 2, 2013, 9 pages.

"International Search Report and Written Opinion", PCT Application No. PCT/US2013/031545, Mar. 14, 2015, 11 pages.

"International Search Report and Written Opinion", PCT Application No. PCT/US2014/0211295, Nov. 24, 2014, 16 pages.

"International Search Report and Written Opinion", PCT Application No. PCT/US2014/054885, Dec. 4, 2014, 8 pages.

"International Search Report and Written Opinion", PCT Application PCT/US2012/036236, Jul. 6, 2012, 9 pages.

"International Search Report", Application No. PCT/US2008/078343, May 18, 2009, 5 pages.

(56) References Cited

OTHER PUBLICATIONS

"International Search Report", Application No. PCT/US2008/078343, Partial International Search, Mar. 5, 2009, 2 pages.
"Invitation to Pay Additional Fees and Partial International Search Report", PCT Application No. PCT/US2014/021295, Aug. 13, 2014, 5 pages.
"Marketing Requirements Document for Interoperability Testing & Certification of Device Provisioning Protocol", Wi-Fi Alliance Device Provisioning Protocol Marketing Task Group; Version 1.2, 2012, 34 pages.
"Non-Final Office Action", U.S. Appl. No. 12/098,254, Jan. 14, 2011, 8 pages.
"Non-Final Office Action", U.S. Appl. No. 12/101,668, Apr. 5, 2011, 7 pages.
"Non-Final Office Action", U.S. Appl. No. 12/101,668, Aug. 9, 2012, 8 pages.
"Non-Final Office Action", U.S. Appl. No. 12/125,670, Dec. 13, 2011, 11 pages.
"Non-Final Office Action", U.S. Appl. No. 12/125,670, Dec. 7, 2010, 9 pages.
"Non-Final Office Action", U.S. Appl. No. 12/125,670, Jun. 4, 2012, 12 pages.
"Non-Final Office Action", U.S. Appl. No. 12/125,693, Oct. 3, 2011, 7 pages.
"Non-Final Office Action", U.S. Appl. No. 12/125,693, Dec. 20, 2010, 7 pages.
"Non-Final Office Action", U.S. Appl. No. 12/178,268, Dec. 21, 2011, 13 pages.
"Non-Final Office Action", U.S. Appl. No. 12/178,268, Dec. 22, 2010, 10 pages.
"Non-Final Office Action", U.S. Appl. No. 12/271,761, Oct. 3, 2011, 6 pages.
"Non-Final Office Action", U.S. Appl. No. 12/541,731, Oct. 21, 2011, 9 pages.
"Non-Final Office Action", U.S. Appl. No. 12/541,731, Sep. 4, 2012, 11 pages.
"Non-Final Office Action", U.S. Appl. No. 12/559,987, Nov. 9, 2011, 10 pages.
"Non-Final Office Action", U.S. Appl. No. 12/636,558, Jan. 10, 2012, 6 pages.
"Non-Final Office Action", U.S. Appl. No. 12/636,558, May 29, 2012, 8 pages.
"Non-Final Office Action", U.S. Appl. No. 13/252,416, Mar. 13, 2013, 16 pages.
"Non-Final Office Action", U.S. Appl. No. 13/333,551, Apr. 6, 2012, 5 pages.
"Non-Final Office Action", U.S. Appl. No. 13/462,972, May 22, 2013, 10 pages.
"Non-Final Office Action", U.S. Appl. No. 13/552,421, Sep. 30, 2014, 23 pages.
"Non-Final Office Action", U.S. Appl. No. 13/598,282, Oct. 16, 2013, 6 pages.
"Non-Final Office Action", U.S. Appl. No. 13/657,511, Mar. 28, 2013, 13 pages.
"Non-Final Office Action", U.S. Appl. No. 13/676,701, Jul. 31, 2015, 12 pages.
"Non-Final Office Action", U.S. Appl. No. 13/683,056, Nov. 8, 2013, 5 pages.
"Non-Final Office Action", U.S. Appl. No. 13/804,425, May 4, 2015, 15 pages.
"Non-Final Office Action", U.S. Appl. No. 13/804,425, Jul. 18, 2014, 14 pages.
"Non-Final Office Action", U.S. Appl. No. 13/863,079, Apr. 9, 2015, 7 pages.
"Non-Final Office Action", U.S. Appl. No. 13/863,079, Jun. 20, 2013, 10 pages.
"Non-Final Office Action", U.S. Appl. No. 13/863,079, Aug. 27, 2014, 6 pages.
"Non-Final Office Action", U.S. Appl. No. 13/863,079, Oct. 1, 2013, 9 pages.
"Non-Final Office Action", U.S. Appl. No. 13/874,201, Jun. 5, 2015, 10 pages.
"Non-Final Office Action", U.S. Appl. No. 13/958,101, Apr. 8, 2015, 16 pages.
"Non-Final Office Action", U.S. Appl. No. 13/958,101, Jun. 6, 2014, 14 pages.
"Non-Final Office Action", U.S. Appl. No. 14/198,994, Jul. 31, 2015, 12 pages.
"Non-Final Office Action", U.S. Appl. No. 14/205,196, Feb. 5, 2016, 14 pages.
"Non-Final Office Action", U.S. Appl. No. 14/281,671, Nov. 22, 2016, 12 pages.
"Non-Final Office Action", U.S. Appl. No. 14/281,671, Nov. 27, 2015, 12 pages.
"Non-Final Office Action", U.S. Appl. No. 14/281,693, Feb. 18, 2016, 4 pages.
"Non-Final Office Action", U.S. Appl. No. 14/482,072, Nov. 19, 2015, 5 pages.
"Notice of Allowance", U.S. Appl. No. 12/098,254, Dec. 14, 2011, 4 pages.
"Notice of Allowance", U.S. Appl. No. 12/098,254, Sep. 28, 2011, 4 pages.
"Notice of Allowance", U.S. Appl. No. 12/101,668, Jan. 11, 2013, 6 pages.
"Notice of Allowance", U.S. Appl. No. 12/125,670, Dec. 11, 2012, 8 pages.
"Notice of Allowance", U.S. Appl. No. 12/178,268, Jul. 2, 2012, 4 pages.
"Notice of Allowance", U.S. Appl. No. 12/271,761, Jan. 3, 2012, 6 pages.
"Notice of Allowance", U.S. Appl. No. 12/541,731, Apr. 2, 2013, 8 pages.
"Notice of Allowance", U.S. Appl. No. 12/559,987, Jun. 15, 2012, 5 pages.
"Notice of Allowance", U.S. Appl. No. 12/636,558, Jan. 9, 2013, 4 pages.
"Notice of Allowance", U.S. Appl. No. 13/252,416, Sep. 27, 2013, 10 pages.
"Notice of Allowance", U.S. Appl. No. 13/333,551, May 30, 2012, 4 pages.
"Notice of Allowance", U.S. Appl. No. 13/552,421, May 12, 2015, 4 pages.
"Notice of Allowance", U.S. Appl. No. 13/552,421, Jun. 10, 2015, 5 pages.
"Notice of Allowance", U.S. Appl. No. 13/598,282, May 6, 2014, 4 pages.
"Notice of Allowance", U.S. Appl. No. 13/657,511, Nov. 4, 2013, 9 pages.
"Notice of Allowance", U.S. Appl. No. 13/676,701, Feb. 10, 2016, 5 pages.
"Notice of Allowance", U.S. Appl. No. 13/683,056, May 9, 2014, 4 pages.
"Notice of Allowance", U.S. Appl. No. 13/804,425, Mar. 21, 2016, 9 pages.
"Notice of Allowance", U.S. Appl. No. 13/874,201, Sep. 25, 2015, 6 pages.
"Notice of Allowance", U.S. Appl. No. 14/198,994, Jan. 29, 2016, 10 pages.
"Notice of Allowance", U.S. Appl. No. 14/281,693, Aug. 8, 2016, 7 pages.
"Notice of Allowance", U.S. Appl. No. 14/482,072, Mar. 22, 2016, 5 pages.
"Notification Concerning Transmittal of Copy of International Preliminary Report on Patentability", PCT Application No. PCT/US2014/021295, Sep. 17, 2015, 12 pages.
"Part 11—Wireless LAN Medium Access Control (MAC) and Physical Layer (PHY) Specifications", Information Technology—Telecommunications & Information Exchange Between Systems . . . International Standard, ISO/IEC 8802-11, First Ed., 1999, pp. 1-531.
"Part 16: Air Interface for Broadband Wireless Access Systems", IEEE Standard for Local and Metropolitan Area Networks, May 29, 2009, 2082 pages.

(56) References Cited

OTHER PUBLICATIONS

"Public Key Cryptography for the Financial Services Industry: Elliptic Curve Key Agreement and Key Transport Schemes", Working Draft; Version 2.0, Jul. 5, 1998, 125 pages.
"Restriction Requirement", U.S. Appl. No. 12/101,668, Sep. 22, 2011, 6 pages.
"Restriction Requirement", U.S. Appl. No. 13/676,701, Feb. 12, 2015, 7 pages.
"Specification of the Bluetooth System, Version 2.0: vol. 0", Master Table of Contents & Compliance Requirements; pp. 1-74; vol. 1, "Architecture & Terminology Overview", pp. 1-92; vol. 2, "Core System Package [Controller Volume]", pp. 1-814; vol. 4, "Core System Package [Host Volume]"; pp. 1-250, Nov. 4, 2004, 1230 pages.
"Specification Requirements Document (SRD) for Devise Provisioning Protocol", Wi-Fi Alliance Device Provisioning Protocol Marketing Task Group; Version 1.1, 2013, 13 pages.
"Supplemental Notice of Allowance", U.S. Appl. No. 12/101,668, Feb. 8, 2013, 4 Pages.
"Supplemental Notice of Allowance", U.S. Appl. No. 13/333,551, Oct. 23, 2012, 2 pages.
"Wi-Fi Peer-to-Peer (P2P) Technical Specification", Wi-Fi Alliance Technical Committee P2P Task Group; Draft Version 1.14, Jun. 25, 2010, 154 pages.
"Wi-Fi Peer-to-Peer (P2P) Technical Specification", WiFi Alliance; Version 1.5, 2014, 183 pages.
Anderson,"HDD Based Full Disc Encryption", In Proceedings of THIC Conference 2006, Mar. 2006, 12 pages.
Chen,"Home Network Basis: Transmission Environments and Wired/Wireless Protocols", Prentice Hall, Jul. 2003, 19 pages.
Cooper,"Internet X.509 Public Key Infrastructure Certificate and Certificate Revocation List (SRL) Profile", Network Working Group; RFC 5280, May 2008, 152 pages.
Harada,"Project: IEEE P802.15 Working Group for Wireless Personal Area Network (WPANs)", IEEE 802.15-07-0693-003c; Slides 24-33 as provided in U.S. Appl. No. 14/198,994 in an IDS submission filed Feb. 24, 2015, May 2007, 10 pages.
Harkins,"Synthetic Initialization Vecor (SIV) Authenticated Encryption Using the Advanced Encryption Standard (AES)", Network Working Group; RFC 5297; Aruba Networks, Oct. 2008, 27 pages.
Hiertz,"The IEEE 802.11 Universe", IEEE Standards in Communications and Networking; IEEE Communications Magazine, Jan. 2010, 9 pages.
Krawczyk,"HMAC-based Extract-and-Expand Key Derivation Function (HKDF)", Internet Engineering Task Forct (IETF); RFC 5869, May 2010, 15 pages.
McGrew,"Fundamental Elliptic Curve Cryptography Algorithms", Internet Engineering Task Force (IETF); RFC 6090; Fundamental Elliptic Cryptography Algorithms, Feb. 2011, 35 pages.
Robinson,"Wi-Fi Simple Configuration Protocol and Usability Best Practices for the Wi-Fi Protected Setup Program", Wi-Fi Alliance; Version 2.0.1, Apr. 2011, 30 pages.
Van Beijnum "Crypto Based Host Identifiers", Internet Draft; draft-van-beijnum-multi6-cbhi-00.K ISSN: 0000-0004; XP15036389A, Jan. 1, 2004, 9 pages.
"Non-Final Office Action", U.S. Appl. No. 14/693,744, Dec. 16, 2016, 24 pages.
"Notice of Allowance", U.S. Appl. No. 14/281,671, dated Apr. 4, 2017, 5 pages.
Perahia,"Gigabit Wireless LANs: an overview of IEEE 802.11ac and 802.11ad", ACM Sigmobile Mobile Computing and Communications Review; vol. 15, No. 3, Nov. 29, 2011, pp. 23-33.
"Final Office Action", U.S. Appl. No. 14/693,744, dated Jun. 13, 2017, 30 pages.

\* cited by examiner

METHODS AND APPARATUS FOR SELECTING A DEVICE TO PERFORM SHARED FUNCTIONALITY IN A DETERMINISTIC AND FAIR MANNER IN A WIRELESS DATA COMMUNICATION SYSTEM

CROSS-REFERENCE TO RELATED APPLICATION

This application is a continuation of and claims priority to U.S. Utility patent application Ser. No. 14/281,693 which in turn claims priority to U.S. Provisional Patent Application Ser. No. 61/825,686 filed May 21, 2013, the disclosures of which are incorporated herein by reference in their entirety.

BACKGROUND

As the number and types of computing and other electronic devices that are available has increased, it has become increasingly important for devices to be able to communicate with one another. To allow devices to communicate with one another, communication protocols that distribute functionality among the devices are oftentimes used. For example, the transmitting of a beacon may be distributed among multiple devices that are communicating with one another. Although allowing communication among various devices allows data transfers between devices as well as various other functionality, allowing such communication is not without its problems. One such problem is that it can be difficult to distribute functionality among the devices, which can result in some devices being unduly burdened with a large amount of the responsibility of providing particular functionality.

SUMMARY

This summary is provided to introduce subject matter that is further described below in the Detailed Description and Drawings. Accordingly, this Summary should not be considered to describe essential features nor used to limit the scope of the claimed subject matter.

In general, in one aspect, this specification describes a method implemented in a first wireless transceiver device of multiple wireless transceiver devices in a wireless data communication system. The method includes obtaining a synchronization value for the wireless data communication system, the synchronization value comprising a value used to facilitate keeping the multiple wireless transceiver devices synchronized. The method also includes generating, for each of the multiple wireless transceiver devices and based on the synchronization value, a device rank for the wireless transceiver device for a given time in a deterministic and fair manner that results in each of the multiple wireless transceiver devices having a highest device rank within a threshold amount of the same number of times over a given time range. The method also includes selecting, based on the generated device ranks, whether the first wireless transceiver device is to perform shared functionality at the given time, the performance of the shared functionality being distributed among the multiple wireless transceiver devices.

In general, in another aspect, this specification describes a first wireless transceiver device of multiple wireless transceiver devices in a wireless data communication system. The first wireless transceiver device includes a microprocessor and one or more computer-readable media storing computer-executable instructions that, when executed by the microprocessor, implement a deterministic fair selector. The deterministic fair selector is configured to obtain a synchronization value for the wireless data communication system, the synchronization value comprising a value used to facilitate keeping the multiple wireless transceiver devices synchronized. The deterministic fair selector is also configured to generate, for each of the multiple wireless transceiver devices and based on the synchronization value, a device rank for the wireless transceiver device for a given time in a deterministic and fair manner that results in each of the multiple wireless transceiver devices having a highest device rank within a threshold amount of the same number of times over a given time range. The deterministic fair selector is further configured to select, based on the generated device ranks, whether the first wireless transceiver device is to perform shared functionality at the given time, the performance of the shared functionality being distributed among the multiple wireless transceiver devices.

In general, in another aspect, this specification describes a computer-readable memory device comprising computer-executable instructions that, when executed, implement a system in a first wireless transceiver device of multiple wireless transceiver devices in a wireless data communication system. The implemented system is to obtain a synchronization value for the wireless data communication system, the synchronization value comprising a value used to facilitate keeping the multiple wireless transceiver devices synchronized. The implemented system is also to generate, for each of the multiple wireless transceiver devices and based on the synchronization value, a device rank for the wireless transceiver device for a given time in a deterministic and fair manner that results in each of the multiple wireless transceiver devices having a highest device rank within a threshold amount of the same number of times over a given time range. The implemented system is also to select, based on the generated device ranks, whether the first wireless transceiver device is to perform shared functionality at the given time, the performance of the shared functionality being distributed among the multiple wireless transceiver devices.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Methods and apparatus for selecting a device to perform shared functionality in a deterministic and fair manner in a wireless data communication system are discussed herein. A wireless data communication system includes multiple wireless transceiver devices each capable of operating as both a transmitter device and a receiver device. Responsibility for performing certain functionality, such as the transmitting of a beacon used to synchronize the wireless transceiver devices, is shared or distributed among the wireless transceiver devices. Each wireless transceiver device generates a device rank for itself as well as one or more other wireless transceiver devices. Each wireless transceiver device determines the same device ranks for the wireless transceiver devices, and each wireless transceiver device selects the wireless transceiver device having a highest device rank at any given time as the wireless transceiver device that is to perform the functionality at that given time.

The device rank is a deterministic and fair rank used to select one of the multiple wireless transceiver devices to perform the functionality at any given time. The device rank being deterministic refers to each of the multiple wireless transceiver devices generating the same device rank for a particular one of the multiple wireless transceiver devices for various given times, such as a current time or at least one future time. Thus, each of the multiple wireless transceiver devices can know the device rank for each of the multiple wireless transceiver devices at any given current or future time. The device rank being fair refers to the device ranks for the multiple wireless transceiver devices being generated so that the number of times each of the multiple wireless transceiver devices has the highest device rank over a given time range is approximately equal (e.g., each of the multiple wireless transceiver devices has the highest device rank over a given time range (e.g., thirty seconds, five minutes, etc.) within a threshold amount (e.g., a fixed amount such as 5 or 10 times, or a relative amount such as 10% or 20% of the number of times) of one another). The device rank being fair results in each of the multiple wireless transceiver devices being selected to perform the functionality approximately the same number of times (e.g., within a threshold amount (e.g., a fixed amount such as 5 or 10 times, or a relative amount such as 10% or 20% of the number of times) of the same number of times) over the given time range.

Figure 1:
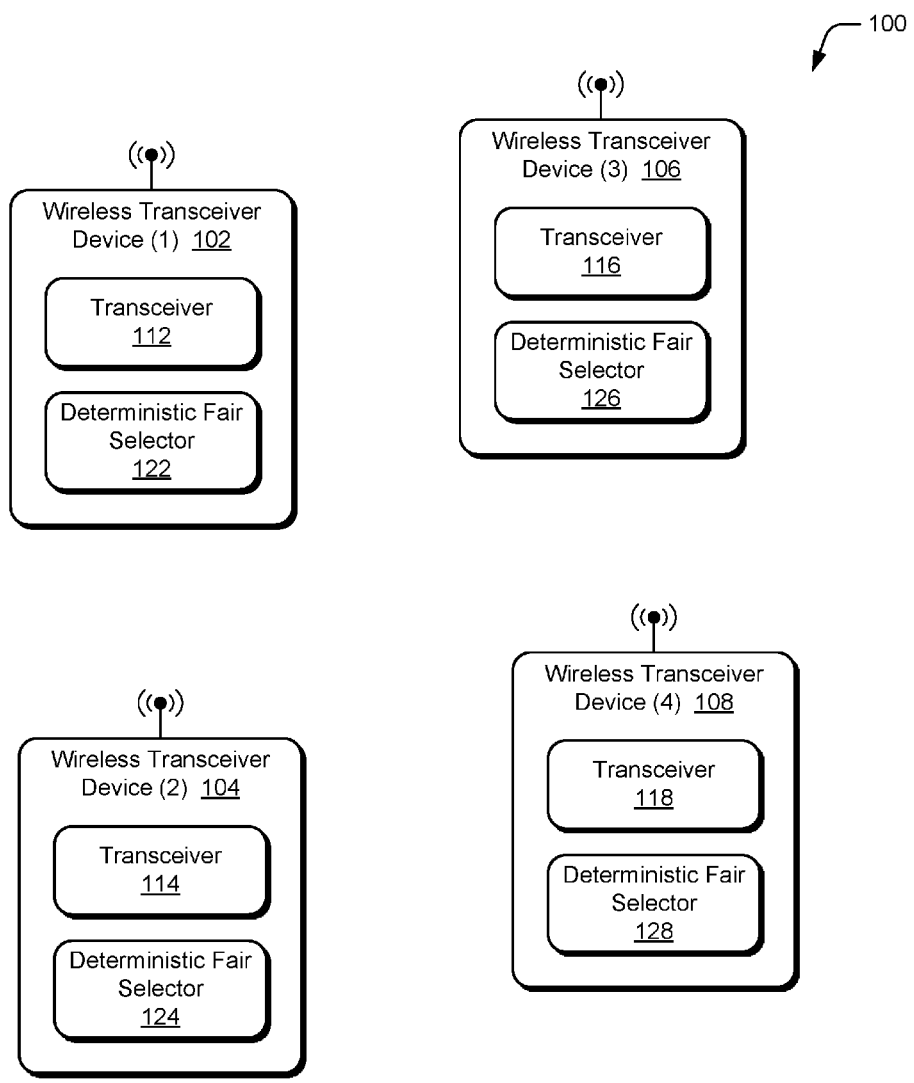
FIG. 1 illustrates an example wireless data communication system in which the methods and apparatus for selecting a device to perform shared functionality in a deterministic and fair manner can be used in accordance with one or more embodiments.

FIG. 1 illustrates an example wireless data communication system 100 in which the methods and apparatus for selecting a device to perform shared functionality in a deterministic and fair manner in a wireless data communication system can be used in accordance with one or more embodiments. The wireless data communication system 100 includes a wireless transceiver device 102, a wireless transceiver device 104, a wireless transceiver device 106, and a wireless transceiver device 108. The wireless transceiver device 102 includes a transceiver 112 that transmits data that can be received by other devices in the wireless data communication system 100, and also receives data transmitted by other devices in the wireless data communication system 100. The wireless transceiver device 104 includes a transceiver 114 that transmits data that can be received by other devices in the wireless data communication system 100, and also receives data transmitted by other devices in the wireless data communication system 100. The wireless transceiver device 106 includes a transceiver 116 that transmits data that can be received by other devices in the wireless data communication system 100, and also receives data transmitted by other devices in the wireless data communication system 100. The wireless transceiver device 108 includes a transceiver 118 that transmits data that can be received by other devices in the wireless data communication system 100, and also receives data transmitted by other devices in the wireless data communication system 100.

It should be noted that although the wireless data communication system 100 is discussed as including multiple wireless transceiver devices, the wireless data communication system 100 can alternatively include one or more transmitter devices that transmit data that can be received by other devices in the wireless data communication system 100 but that do not receive data transmitted by other devices in the wireless data communication system 100. The wireless data communication system 100 can also alternatively include one or more receiver devices that receive data transmitted by other devices in the wireless data communication system 100 but that do not transmit data that can be received by other devices in the wireless data communication system 100.

Certain functionality is distributed among the wireless transceiver devices 102, 104, 106, and 108, with different ones of the wireless transceiver devices 102, 104, 106, and 108 performing particular shared functionality at given times. In one or more embodiments, the shared functionality that is distributed among the wireless transceiver devices 102, 104, 106, and 108 is the transmission of a beacon in the wireless data communication system 100. The beacon is used by the wireless transceiver devices 102, 104, 106, and 108 to determine when to listen for data and when to send data, as discussed in more detail below.

In the discussions herein, reference is made to the functionality being distributed among all of the wireless transceiver devices 102, 104, 106, and 108. Alternatively, in some situations the functionality is distributed among certain ones of the wireless transceiver devices 102, 104, 106, and 108 (e.g., ones of the wireless transceiver devices 102, 104, 106, and 108 designated as masters). In such situations, which ones of the wireless transceiver devices 102, 104, 106, and 108 the functionality is shared across can be determined using any of a variety of public or proprietary techniques.

The wireless transceiver device 102 includes a deterministic fair selector 122 that generates a device rank for itself as well as the other wireless transceiver devices 104, 106, and 108. The wireless transceiver device 104 includes a deterministic fair selector 124 that generates a device rank for itself as well as the other wireless transceiver devices 102, 106, and 108. The wireless transceiver device 106 includes a deterministic fair selector 126 that generates a device rank for itself as well as the other wireless transceiver devices 102, 104, and 108. The wireless transceiver device 108 includes a deterministic fair selector 128 that generates a device rank for itself as well as the other wireless transceiver devices 102, 104, and 106.

The device ranks generated by the deterministic fair selectors 122, 124, 126, and 128 are deterministic and fair ranks used to select one of the wireless transceiver devices 102, 104, 106, or 108 to perform the shared functionality at any given time. The device rank is deterministic, so each of the wireless transceiver devices 102, 104, 106, and 108 generates the same device rank for each of the wireless transceiver devices 102, 104, 106, and 108 for a given time. For example, deterministic fair selector 122, 124, 126, and 128 each generate the same device rank for wireless transceiver device 102 at a given time, each generate the same device rank for wireless transceiver device 104 at a given time, and so forth.

As indicated above, in one or more embodiments the shared functionality that is distributed among the wireless transceiver devices 102, 104, 106, and 108 is the transmission of a beacon used by the wireless transceiver devices 102, 104, 106, and 108 to determine when to listen for data and when to send data. For example, each wireless transceiver device 102, 104, 106, and 108 device in the wireless data communication system 100 can know that it is to receive data during one particular range of microseconds after receipt of a beacon, and that it is to send data during another particular range of microseconds after the beacon.

In one or more embodiments, the wireless data communication system 100 uses a communication protocol that includes beacons and that is compliant with Wi-Fi networks, such as networks implementing the IEEE 802.11 standard (e.g., as discussed in the IEEE Std 802.11-2012, Mar. 29, 2012). The wireless data communication system 100 operates in one of various modes of operation that are compliant with the IEEE 802.11 standard, such as BSS (Basic Service Set), IBSS (Independent Basic Service Set), NAN (Neighbor Awareness Networking), and so forth. Although reference is made herein to the IEEE 802.11 standard, it should be noted that the techniques discussed herein are also usable with other standards and signaling technologies.

In one or more embodiments, a beacon is transmitted in the wireless data communication system 100 at regular or irregular intervals. One of the wireless transceiver devices 102, 104, 106, or 108 transmits the beacon at the time after each interval elapses. The responsibility of transmitting the beacon is shared by the wireless transceiver devices 102, 104, 106, or 108, also referred to as being distributed among the wireless transceiver devices 102, 104, 106, or 108. Which of the wireless transceiver devices 102, 104, 106, and 108 transmits the beacon at a particular time is based at least in part on the device rank generated by the deterministic fair selectors 122, 124, 126, and 128.

Figure 2:
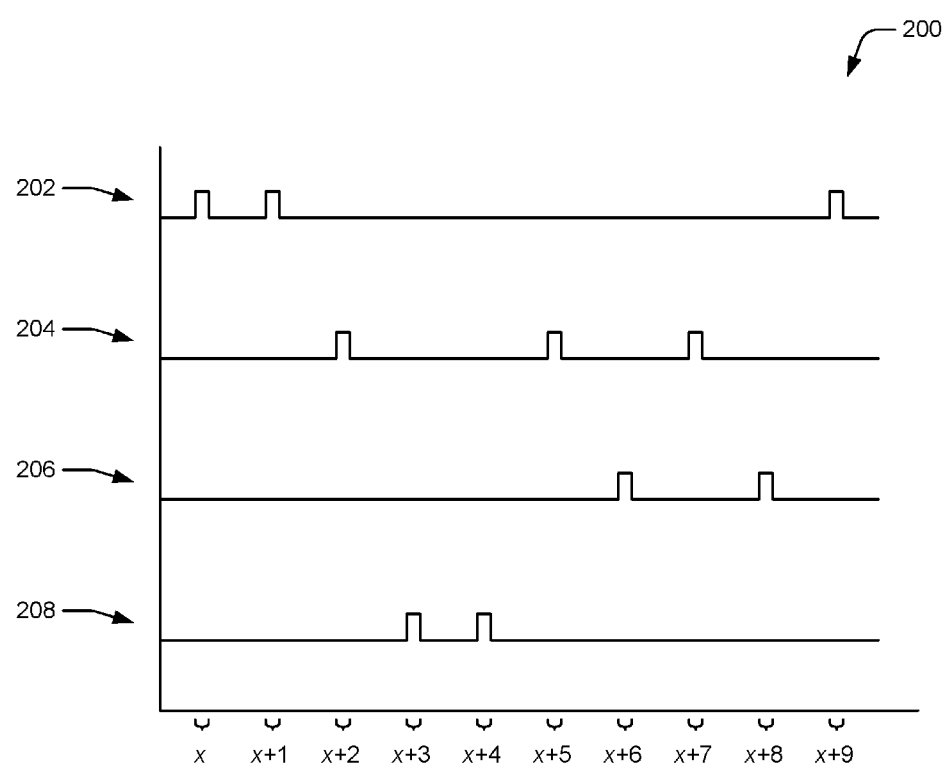
FIG. 2 illustrates an example of the timing of sending beacons in a wireless data communication system in accordance with one or more embodiments.

FIG. 2 illustrates an example of the timing of sending beacons in a wireless data communication system in accordance with one or more embodiments. A timing diagram 200 illustrates a timing of when each of multiple wireless transceiver devices transmit a beacon. A timing 202 corresponds to one wireless transceiver device (e.g., wireless transceiver device 102), a timing 204 corresponds to another wireless transceiver device (e.g., wireless transceiver device 104), a timing 206 corresponds to another wireless transceiver device (e.g., wireless transceiver device 106), and a timing 208 corresponds to another wireless transceiver device (e.g., wireless transceiver device 108).

Multiple times x, x+1, x+2, and so forth are shown in FIG. 2. Which wireless transceiver device transmits a beacon during which interval is shown by a bump or rise in the timings 202, 204, 206, and 208. For example, the wireless transceiver device corresponding to timing 202 transmits the beacon at times x, x+1, and x+9. The wireless transceiver device corresponding to timing 204 transmits the beacon at times x+2, x+5, and x+7. The wireless transceiver device corresponding to timing 206 transmits the beacon at times x+6 and x+8. The wireless transceiver device corresponding to timing 208 transmits the beacon at times x+3 and x+4.

Figure 3:
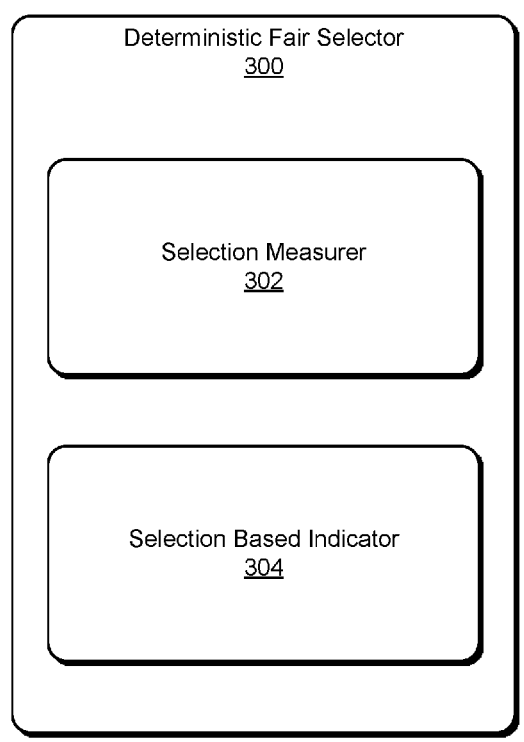
FIG. 3 illustrates an example deterministic fair selector in accordance with one or more embodiments.

FIG. 3 illustrates an example deterministic fair selector 300 in accordance with one or more embodiments. The deterministic fair selector 300 is a deterministic fair selector of a wireless transceiver device in a wireless data communication system. The deterministic fair selector 300 can be any one of deterministic fair selectors 122, 124, 126, or 128 of FIG. 1. The deterministic fair selector 300 includes a selection measurer 302 and a selection based indicator 304.

The selection measurer 302 generates values, also referred to as selection measures, for each of the wireless transceiver devices that participate in performing the shared functionality. The selection measurer 302 generates a selection measure for a wireless transceiver device using one or more functions that are based on both an identifier of the wireless transceiver device and a synchronization value. Any of a variety of different functions can be used, such as a concatenation of the identifier and the synchronization value, a hash function (optionally a cryptographic hash function) applied to a concatenation of the identifier and the synchronization value, and so forth.

Any of a variety of different identifiers that allow the wireless transceiver device to be distinguished from other wireless transceiver devices that participate in performing the shared functionality can be used by the selection measurer 302. In one or more embodiments, the identifier of the device is a MAC (media access control) address. Alternatively, other identifiers are used, such as a network address (e.g., an IP (Internet protocol) address). A wireless transceiver device knows its own identifier, such as being pre-configured with its own identifier, being assigned its identifier by another device or service, and so forth. A wireless transceiver device also knows the identifiers of other wireless transceiver devices in the wireless data communication system, such as being notified by the other wireless transceiver devices when the other wireless transceiver devices join or otherwise establish communication with the wireless data communication system, receiving beacons or other data communications sent by the wireless transceiver devices, and so forth.

The selection measurer 302 optionally combines the identifier of the wireless transceiver device with one or more other values. Various different techniques for combining values can be used, such as concatenating values, logically exclusive OR'ing values, and so forth. For example, the selection measurer 302 can combine the identifier of the wireless transceiver device with the identifiers (or portions thereof) of other wireless transceiver devices.

The synchronization value is a value used to facilitate keeping the wireless transceiver devices in the wireless data communication system synchronized. The wireless transceiver devices keep and update their own copies of the synchronization value, and thus the synchronization value can also be referred to as a shared or common synchronization value. In one or more embodiments, the synchronization value is a TSF (Timing Synchronization Function) value such as is used with the IEEE 802.11 standard (e.g., as discussed in the IEEE Std 802.11-2012, Mar. 29, 2012). Each wireless transceiver device in the wireless data communication system keeps track of the TSF. The TSF values are also transmitted as part of the beacon, and the TSF value for a wireless transceiver device is updated as appropriate based on a received beacon. Whether the TSF value is updated can vary based on different criteria, such as whether a received TSF value is greater than the TSF value the wireless transceiver device has. Although TSF values may vary slightly between wireless transceiver devices, the TSF values maintained by different wireless transceiver devices are typically approximately the same (e.g., within a threshold amount of one another). The amount that the TSF values may differ can optionally be filtered out, such as by using a mask value as discussed in more detail below.

Alternatively, the selection measurer 302 uses values other than the TSF value as the synchronization value. Various other values can be used, such as any time indication (e.g., a current date and time maintained by the wireless transceiver devices), counters that increase by known amounts at known intervals, and so forth.

It should be noted that each wireless transceiver device knows how the synchronization value is incremented, and thus each wireless transceiver device knows what the synchronization value will be at future times. For example, referring to FIG. 2, if the current time is time x, each wireless transceiver device knows that the synchronization value is expected to increase to a particular value at time x+1, increase to another particular value at time x+2, and so forth. The selection measurer 302 can use these expected values to generate a device rank for a future time. For example, at time x the selection measurer 302 knows the expected synchronization values at times x+1 and x+2, as well as the identifier of the wireless transceiver device at times x+1 and x+2, and thus can readily generate a device rank for the wireless transceiver device at times x+1 and x+2.

The synchronization value can be combined with other values, such as a mask. The selection measurer 302 combines the synchronization value with a mask value in any of a variety of manners, such as using a logical exclusive OR operation, a logical AND, operation, and so forth. In one or more embodiments, the selection measurer 302 combines the synchronization value with a mask value to filter out or otherwise ignore certain bits of the synchronization value, such as the high or low order bits of the synchronization value. By filtering out or otherwise ignoring certain bits, the synchronization value can be modified to exclude the bits that change most frequently, resulting in the synchronization value (as modified) changing more slowly over time. For example, the appropriate high or low order bits of the synchronization value can be filtered out so that the synchronization value (as modified) changes every second rather than every millisecond.

The selection measurer 302 generates the device rank for each wireless transceiver device in the wireless data communication system that participates in performing the shared functionality. Each wireless transceiver device knows the identifier of each other wireless transceiver device, and the synchronization value (including any modifications to the synchronization value, such as combining the synchronization value with a mask value) is the same for all wireless transceiver devices, so the selection measurer 302 can readily generate the device ranks for each wireless transceiver device in the wireless data communication system.

In one or more embodiments, the selection measurer 302 uses the selection measures generated for the wireless transceiver devices as the device ranks for the wireless transceiver devices. In such embodiments, the wireless transceiver device having the largest (or alternatively smallest) synchronization value has the highest device rank. Alternatively, the selection measurer 302 uses the selection measures generated for the wireless transceiver devices to generate the device ranks for the wireless transceiver devices. The selection measurer 302 can use the selection measures to generate the device ranks in different manners, such as selecting the second largest synchronization value as the highest device rank, using other criteria or rules to assign device ranks, and so forth.

It should be noted that the selection measurer 302 in each wireless transceiver device operates to generate synchronization values for the wireless transceiver devices in the same manner. The selection measurer 302 in each wireless transceiver device relies on the same values when generating the synchronization value for each wireless transceiver device, and determines the device ranks in the same manner. Thus, the deterministic fair selector 300 of each wireless transceiver device that participates in performing the shared functionality determines the same device ranks for any given time as the deterministic fair selectors 300 of the other wireless transceiver devices that participate in performing the shared functionality.

The selection measurer 302 also determines whether the device rank for the wireless transceiver device that includes the selection measurer 302 is the highest at a particular given time. In each wireless transceiver device, the selection measurer 302 in the device determines that the wireless transceiver device is the selected wireless transceiver device or is the "winner" in response to the device rank for the wireless transceiver device being the highest. Additionally, in each wireless transceiver device, the selection measurer 302 in the device determines that the wireless transceiver device is not the selected wireless transceiver device or is the "loser" in response to the device rank for the wireless transceiver device not being the highest. The given time can be a current time or some future time. For example, referring to FIG. 2, if the current time is time x, the selection measurer 302 can determine whether the wireless transceiver device that includes the selection measurer 302 has the highest device rank at future time x+1, at future time x+2, and so forth.

The selection based indicator 304 takes an appropriate action for a given time based on whether the wireless transceiver device that includes the selection based indicator 304 has the highest device rank at the given time. The appropriate action is also based on the shared functionality. In one or more embodiments, the shared functionality is transmitting of a beacon. In response to the selection measurer 302 indicating that the device has the highest device rank at the given time, the selection based indicator 304 prepares for the wireless transceiver device including the deterministic fair selector 300 to transmit a beacon at the given time. The selection based indicator 304 prepares to transmit the beacon by obtaining the information to be included in the beacon and providing a frame to transmit as the beacon to the transceiver of the wireless transceiver device, or alternatively prepares to transmit the beacon by informing another component or module of the wireless transceiver device to perform the appropriate operations for the transceiver of the wireless transceiver device to transmit the beacon at the given time.

In response to the selection measurer 302 indicating that the device does not have the highest device rank at the given time, the selection based indicator 304 allows the wireless transceiver device to sleep through the given time. The wireless transceiver device need not wake up or otherwise transition out of a lower power mode at the given time in order to check for a beacon or obtain a value to generate the synchronization value for later times. For example, referring to FIG. 2, if the current time is time x and the given time is time x+1, the selection based indicator 304 can allow the wireless transceiver device to sleep through time x+1. Additionally, the selection measurer 302 determines at the current time x what the device rank for the wireless transceiver device will be at time x+2, so the wireless transceiver device need not wake up at time x+1 in order to obtain any value that it uses to determine its device rank at time x+2. The selection based indicator 304 can have the wireless transceiver device similarly sleep through subsequent given times for which the wireless transceiver device is not the highest ranked device, such as time x+3, time x+4, and so forth.

Figure 4:
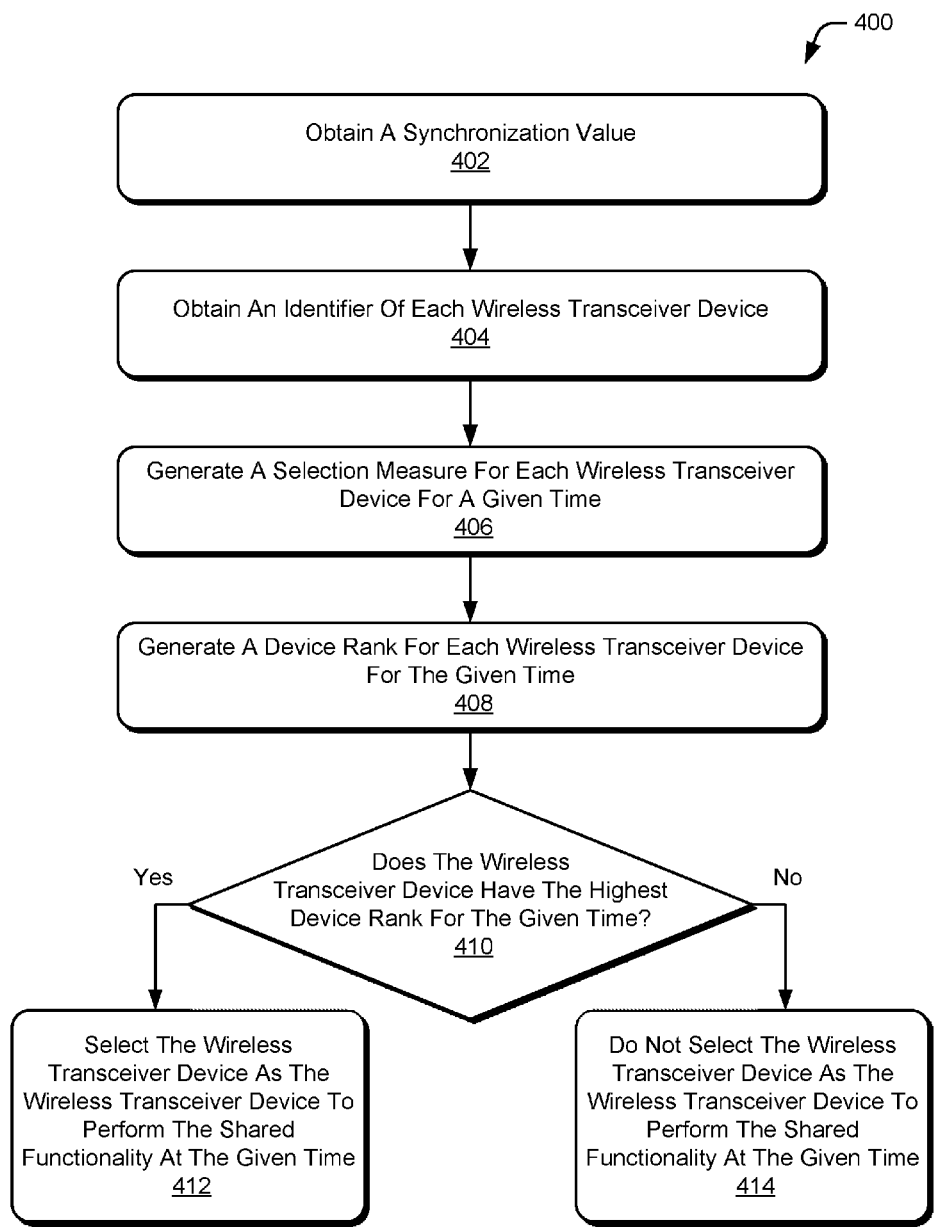
FIG. 4 is a flowchart illustrating an example process for implementing the techniques discussed herein in accordance with one or more embodiments.

FIG. 4 is a flowchart illustrating an example process 400 for implementing the techniques discussed herein in accordance with one or more embodiments. Process 400 is described in the form of a set of blocks that specify operations to be performed, however the operations are not necessarily limited to the order shown. The operations performed by the set of blocks in process 400 are performed by a wireless transceiver device, such as a wireless transceiver device 102, 104, 106, or 108 of FIG. 1.

At block 402, a synchronization value is obtained. The synchronization value is a synchronization value for the wireless data communication system, and the wireless transceiver device maintains its own local copy of this synchronization value that can be obtained at block 402. The synchronization value can take various forms, such as a TSF value as discussed above.

At block 404, an identifier of each wireless transceiver device is obtained. The wireless transceiver devices for which identifiers are obtained are the wireless transceiver devices in the wireless data communication system that participate in performing the shared functionality. The identifiers of the wireless transceiver devices can be obtained in different manners as discussed above.

At block 406, a selection measure for each wireless transceiver device is generated for a given time. The given time can be a current time or a future time, as discussed above. The selection measures can be generated in different manners as discussed above for each of the wireless transceiver devices in the wireless data communication system that participate in performing the shared functionality.

At block 408, a device rank for each wireless transceiver device is generated for a given time. The given time can be a current time or a future time, as discussed above. The device ranks can be generated in different manners based on the selection measures as discussed above. In situations in which the device rank is the selection measure, block 408 need not be performed as the selection measures generated at block 406 are used as the device ranks.

At block 410, a check is made as to whether the wireless transceiver device implementing process 400 has the highest device rank for the given time. At block 412, in response to the wireless transceiver device implementing process 400 having the highest device rank for the given time, the wireless transceiver device implementing process 400 is selected as the wireless transceiver device to perform the shared functionality at the given time (e.g., transmit a beacon at the given time).

At block 414, in response to the wireless transceiver device implementing process 400 not having the highest device rank for the given time, the wireless transceiver device implementing process 400 is not selected as the wireless transceiver device to perform the shared functionality at the given time. Rather, the other of the wireless transceiver devices in the wireless data communication system that does have the highest device rank for the given time performs the shared functionality at the given time.

The techniques discussed herein support various usage scenarios. The techniques discussed herein provide a selection technique that results in a fair selection of wireless transceiver devices performing the shared functionality over time. One wireless transceiver device, such as the wireless transceiver device having the largest or smallest MAC address, is not consistently selected as the wireless transceiver device to perform the shared functionality. Rather, the selected wireless transceiver device changes over time based on the synchronization value.

The techniques discussed herein also provide a selection technique that results in a deterministic selection of wireless transceiver devices performing the shared functionality over time. Each wireless transceiver device can determine for one or more future times whether the wireless transceiver device is the wireless transceiver device selected to perform the shared functionality. If the wireless transceiver device is not the wireless transceiver device selected to perform the shared functionality, the wireless transceiver device can take an appropriate action such as sleeping through the one or more future times. The wireless transceiver devices do not rely on a value that is random or that must be transmitted in each beacon, and thus the wireless transceiver devices need not be awake to receive beacons during times that the wireless transceiver devices are not selected to transmit the beacon.

Figure 5:
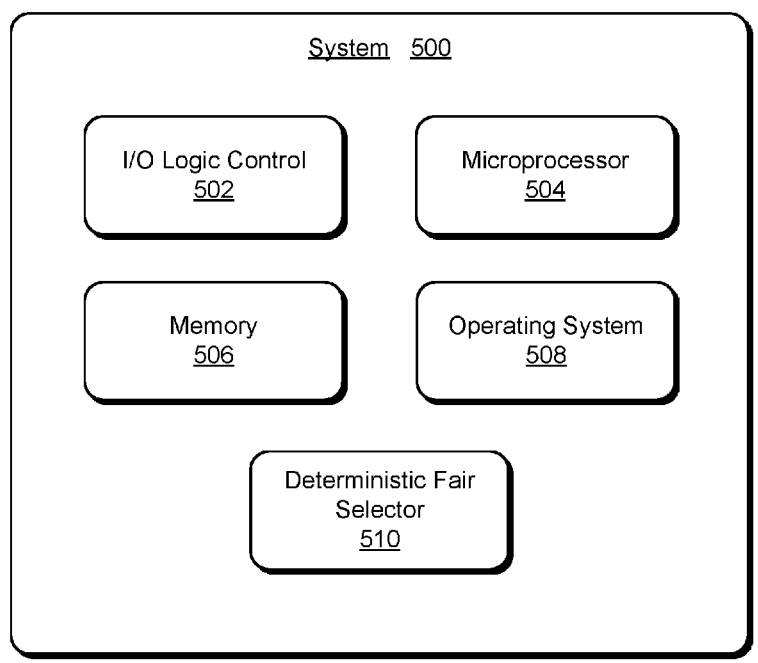
FIG. 5 illustrates an example system that can implement various aspects of the techniques described herein.

FIG. 5 illustrates an example system 500 that can implement various aspects of the techniques described herein. System 500 can be implemented in a variety of different devices, such as one or a combination of a media device, computer device, television set-top box, video processing and/or rendering device, Ethernet interface, switch, appliance device, gaming device, electronic device, vehicle, workstation, smart phone, tablet, and/or in any other type of computing device. System 500 can be implemented as a System-on-Chip (SoC).

System 500 can include electronic circuitry, a microprocessor, memory, input-output (I/O) logic control, communication interfaces and components, other hardware, firmware, and/or software needed to run a device. System 500 can also include an integrated data bus (not shown) that couples the various components of the system for data communication between the components. A wireless communication device that includes system 500 can also be implemented with many combinations of differing components.

In this example, system 500 includes various components such as an input-output (I/O) logic control 502 (e.g., to include electronic circuitry) and a microprocessor 504 (e.g., any of a microcontroller or digital signal processor). System 500 also includes a memory 506, which can be any type and/or combination of RAM, low-latency nonvolatile memory (e.g., Flash memory), ROM, one-time programmable memory, and/or other suitable electronic data storage. Alternately or additionally, system 500 may comprise a memory interface for accessing additional or expandable off-chip memory, such as an external Flash memory module. System 500 can also include various firmware and/or software, such as an operating system 508, which can be computer-executable instructions maintained by memory 506 and executed by microprocessor 504. System 500 may also include other various communication interfaces and components, communication components, other hardware, firmware, and/or software, and so forth.

System 500 also includes a deterministic fair selector 510 that determines whether a wireless transceiver device including or implementing system 500 is to perform shared functionality at a given time as discussed herein. The deterministic fair selector 510 can be, for example, a deterministic fair selector 122, 124, 126, or 128 of FIG. 1, or a deterministic fair selector 300 of FIG. 3. The deterministic fair selector 510 can be implemented in hardware, firmware, software, or combinations thereof.

One or more of the methods or techniques described above can take the form of a computer program product accessible from a computer-usable or computer-readable medium providing program code for use by or in connection with a computer or any instruction execution system. For the purposes of this description, a computer-usable or computer-readable medium can be any apparatus that can tangibly store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium can include computer-readable memory devices, which can be any of the devices or mediums discussed above, although excludes signals, signal transmission, and carrier waves.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method implemented in a first transceiver device of multiple transceiver devices in a data communication system configured to distribute functionality among the multiple transceiver devices, the method comprising:
   sending an identifier of the first transceiver device to other transceiver devices of the multiple transceiver devices;
   receiving identifiers of the other transceiver devices;
   updating a synchronization value for the data communication system, the updated synchronization value comprising a value used to facilitate keeping the multiple transceiver devices synchronized;
   generating for a given time, for each transceiver device of the multiple transceiver devices, a selection measure from the updated synchronization value and the respective identifier of each of the transceiver devices;
   ranking for the given time each of the multiple transceiver devices based on the generated selection measures; and
   selecting, based on the ranking, one of the multiple transceiver devices as a transceiver to transmit a beacon at the given time.

2. The method of claim 1, wherein the selected one of the multiple transceiver devices is the first transceiver device, and in response to the selecting, further comprising transmitting the beacon at the given time.

3. The method of claim 1, wherein the selected one of the multiple transceiver devices is one of the other transceiver devices, and in response to the selecting, further comprising configuring the first transceiver device to sleep through the given time.

4. The method of claim 1, wherein the given time comprises one or more future times.

5. The method of claim 1, wherein the ranking is performed in a deterministic and fair manner that results in each of the multiple transceiver devices having a highest device rank in the ranking within a threshold amount of the same number of times over a given time range.

6. The method of claim 1, wherein the selection measure for said each transceiver device is generated by concatenation of the updated synchronization value and the respective identifier of each of the transceiver devices.

7. The method of claim 1, wherein the synchronization value is part of an additional beacon received by one of the other transceiver devices, the additional beacon corresponding to a different time than the given time.

8. The method of claim 1, wherein the selected one of the multiple transceiver devices is a highest ranked transceiver according to the ranking.

9. The method of claim 1, wherein the selected one of the multiple transceiver devices is selected from a subset of the multiple transceiver devices comprising less than all of the multiple transceiver devices.

10. The method of claim 1, wherein the identifiers of the other transceiver devices are received from the other transceiver devices.

11. The method of claim 1, further comprising receiving an additional beacon, and responsive to the receiving the additional beacon, sending or receiving data during a particular range of time after the additional beacon.

12. The method of claim 1, wherein the identifier of the first transceiver device and the identifiers of the other transceiver devices comprise network addresses.

13. A first transceiver device of multiple transceiver devices in a data communication system configured to distribute functionality among the multiple transceiver devices, the first transceiver device comprising:
   a microprocessor; and
   one or more computer-readable media storing computer-executable instructions that, when executed by the microprocessor, implement a selector to:
      send an identifier of the first transceiver device to other transceiver devices of the multiple transceiver devices;
      receive identifiers of the other transceiver devices;
      update a synchronization value for the data communication system, the updated synchronization value comprising a value used to facilitate keeping the multiple transceiver devices synchronized;
      generate for a given time, for each transceiver device of the multiple transceiver devices, a selection measure from the updated synchronization value and the respective identifier of each of the transceiver devices;
      rank for the given time each of the multiple transceiver devices based on the generated selection measures; and
      select, based on the rank, one of the multiple transceiver devices as a transceiver to transmit a beacon at the given time.

14. The first transceiver device of claim 13, wherein the selected one of the multiple transceiver devices is the first transceiver device, and in response to the selection, further comprising to transmit the beacon at the given time.

15. The first transceiver device of claim 13, wherein the selected one of the multiple transceiver devices is one of the other transceiver devices, and in response to the selection, further comprising configuring the first transceiver device to sleep through the given time.

16. The first transceiver device of claim 13, wherein the rank is performed in a deterministic and fair manner that results in each of the multiple transceiver devices having a highest device rank in the rank within a threshold amount of the same number of times over a given time range.

17. The first transceiver device of claim 13, wherein the selected one of the multiple transceiver devices is a highest ranked transceiver according to the rank.

18. A non-transitory computer-readable memory device comprising computer-executable instructions that, when executed, implement a system in a first transceiver device of multiple transceiver devices in a data communication system configured to distribute functionality among the multiple transceiver devices, the system in the first transceiver device configured to:
   send an identifier of the first transceiver device to other transceiver devices of the multiple transceiver devices;

receive identifiers of the other transceiver devices;
update a synchronization value for the data communication system, the updated synchronization value comprising a value used to facilitate keeping the multiple transceiver devices synchronized;
generate for a given time, for each transceiver device of the multiple transceiver devices, a selection measure from the updated synchronization value and the respective identifier of each of the transceiver devices;
rank for the given time each of the multiple transceiver devices based on the generated selection measures; and
select, based on the rank, one of the multiple transceiver devices as a transceiver to transmit a beacon at the given time.

19. The non-transitory computer-readable memory device of claim 18, wherein the selected one of the multiple transceiver devices is the first transceiver device, and in response to the selection, further comprising to transmit the beacon at the given time.

20. The non-transitory computer-readable memory device of claim 18, further comprising to receive an additional beacon, and responsive to the reception of the additional beacon, sending first data during a first range of time after the additional beacon and receiving second data during a second range of time after the additional beacon.

* * * * *